United States Patent [19]
Sudo et al.

[11] Patent Number: 5,320,191
[45] Date of Patent: Jun. 14, 1994

[54] STEERING CIRCUIT SYSTEM FOR A MOVING VEHICLE

[75] Inventors: Tsugio Sudo; Takao Nagai, both of Kawasaki, Japan

[73] Assignee: Kabushiki Kaisha Komatsu Seisakusho, Tokyo, Japan

[21] Appl. No.: 10,675

[22] Filed: Jan. 28, 1993

[51] Int. Cl.$^5$ ............................................. B62D 5/06
[52] U.S. Cl. ............................................. 180/132
[58] Field of Search ................. 180/132, 131, 133, 79

[56] References Cited

U.S. PATENT DOCUMENTS

4,219,093  8/1980  Lang ..................... 180/132

FOREIGN PATENT DOCUMENTS

| | | |
|---|---|---|
| 3619331 | 1/1987 | Fed. Rep. of Germany . |
| 61-70618 | 4/1986 | Japan . |
| 3-184137 | 6/1991 | Japan . |
| 5-8742 | 1/1993 | Japan . |
| 8605455 | 9/1986 | World Int. Prop. O. ......... 180/132 |

Primary Examiner—Margaret A. Focarino
Assistant Examiner—Kevin Hurley
Attorney, Agent, or Firm—Cushman, Darby & Cushman

[57] ABSTRACT

A steering circuit system for a moving vehicle in which automatic steering operation as well as manual steering operation can be achieved. Pressurized oil discharged from a hydraulic pump (1) is fed to a steering line (3) and to an auxiliary steering line (10). The pressurized oil of the steering line (3) is fed to an expanding chamber (9a, 90a) and to a contracting chamber (9b, 90b) of a pair of steering cylinders (9, 90) by manual operation steering valve (5). The auxiliary steering line (10) is connected to a third line (12) through a switching valve (11). The third line (12) is connected to a fourth line and to a fifth line (14, 15) through an automatic operation steering valve (13). The fourth line (14) is connected to contracting chamber (9b) and to expanding chamber (90a) of the left and right steering cylinders (9, 90). The fifth line (15) is connected to contracting chamber (90b) and expanding chamber (9a) of the left and right steering cylinders (9, 90). First and second pilot operation check valves (16, 17) are provided in the fourth and the fifth lines (14, 15), respectively. The first pilot operation check valve is opened in response to pressure in the fifth line (15), and the second pilot operation valve is opened in response to pressure in the fourth line (14).

13 Claims, 2 Drawing Sheets

STEERING CIRCUIT SYSTEM FOR A MOVING VEHICLE

BACKGROUND OF THE INVENTION

1. Field of the Invention

The present invention relates to a moving vehicle steering circuit system capable of both automatic and manual steering.

2. Description of the Related Art

A conventional steering circuit system for a moving vehicle is known in which pressurized oil discharged from a hydraulic pump is fed to a steering cylinder by a manual operation steering valve. It is also known that a pilot operation check valve may be provided for the purpose of preventing the pressurized oil of the steering cylinder from flowing back. This ensures the function of a return side or drain line by utilizing the pilot pressure as long as the pressurized oil is fed to one side of the steering cylinder.

However, such steering circuit systems inconveniently require manual operation by an operator, and thus automatic operation cannot be achieved. When the pressurized oil ceases to be fed to the steering cylinder, the pressurized oil of the return side line is suddenly blocked. Nevertheless, since the steering wheel has inertia, it is vibrated by the oil hammer and the stability of the vehicle body is adversely affected.

SUMMARY OF THE INVENTION

It is therefore an object of the present invention to provide a steering circuit system for a moving vehicle which is able to solve the foregoing problems.

To this end, a discharge side of a hydraulic pump is connected to a primary steering circuit and to an auxiliary steering circuit. The primary steering circuit includes a manual operation steering valve and the auxiliary steering circuit includes an automatic operation steering valve. Pilot operation check valves are provided in lines connecting the automatic operation steering valve and the steering cylinders. Thus, an auxiliary, automatic steering system can be easily provided with along with a primary, manual steering system. In the system according to the present invention, manual steering can be achieved by operating the manual operation steering valve and automatic steering can be achieved by operating the automatic operation steering valve.

In accordance with a first embodiment, the present invention provides steering circuit system for a moving vehicle, comprising a first hydraulic line, a second hydraulic line, a hydraulic pump having a discharge line, and a first steering cylinder having a first expanding chamber and a first contracting chamber. A manual operation steering valve is connected to the discharge line of the hydraulic pump and has a first position connecting the discharge line with the first contracting chamber by way of the first line, and a second position connecting the discharge line with the first expanding chamber by way of the second line. The first embodiment further comprises a third hydraulic line; a switching valve connecting the discharge line to the third line; a fourth line having a first pilot operation check valve therein, and a fifth line having a second pilot operation check valve therein, wherein the first pilot operation check valve is constructed to open in response to oil pressure in the fifth line and the second pilot operation check valve is constructed to open in response to pressure in the fourth line; and an automatic operation steering valve having a first position connecting the third line to the first contracting chamber by way of the fourth line, and having a second position connecting the third line to the first expanding chamber by way of the fifth line.

The steering circuit system according to the present invention preferably further comprises a second steering cylinder having a second expanding chamber and a second contracting chamber. The automatic operation steering valve connects the third line to the second contracting chamber by way of the fifth line when the automatic operation steering valve is in the second position, and connects the third line to the second expanding chamber by way of the fourth line when the automatic operation steering valve is in the first position.

In a further embodiment, an orifice check is provided both in a first pilot line and a second pilot line. The first pilot line feeds the pressurized oil of a fifth line to a first pilot operation check valve. The second pilot line feeds the pressurized oil of a fourth line to a second pilot operation check valve. Consequently, the pressurized oil of the fourth line can be smoothly fed into the second pilot operation check valve, and the pressurized oil of the fifth line can be smoothly fed into the first pilot operation check valve. When pressurized oil is fed into the steering cylinders, the pressurized oil of the return side line from the steering cylinder is promptly discharged to a tank, thereby improving the steering responsiveness. When pressurized oil ceases to be fed into the steering cylinders, the pressurized oil acting on either the first pilot operating check valve or the second pilot operation check valve is slowly lowered and gradually blocked. As a result, the pressurized oil of the return side line drained from the steering cylinder is not suddenly blocked, so that the steering wheel is not vibrated by the oil hammer and the stability of the moving vehicle body is not adversely affected.

Further objects features and advantages of the present invention will become apparent from the Detailed Description of Preferred Embodiments which follows when considered together with the attached Drawings.

DETAILED DESCRIPTION OF PREFERRED EMBODIMENTS

Figure 1:
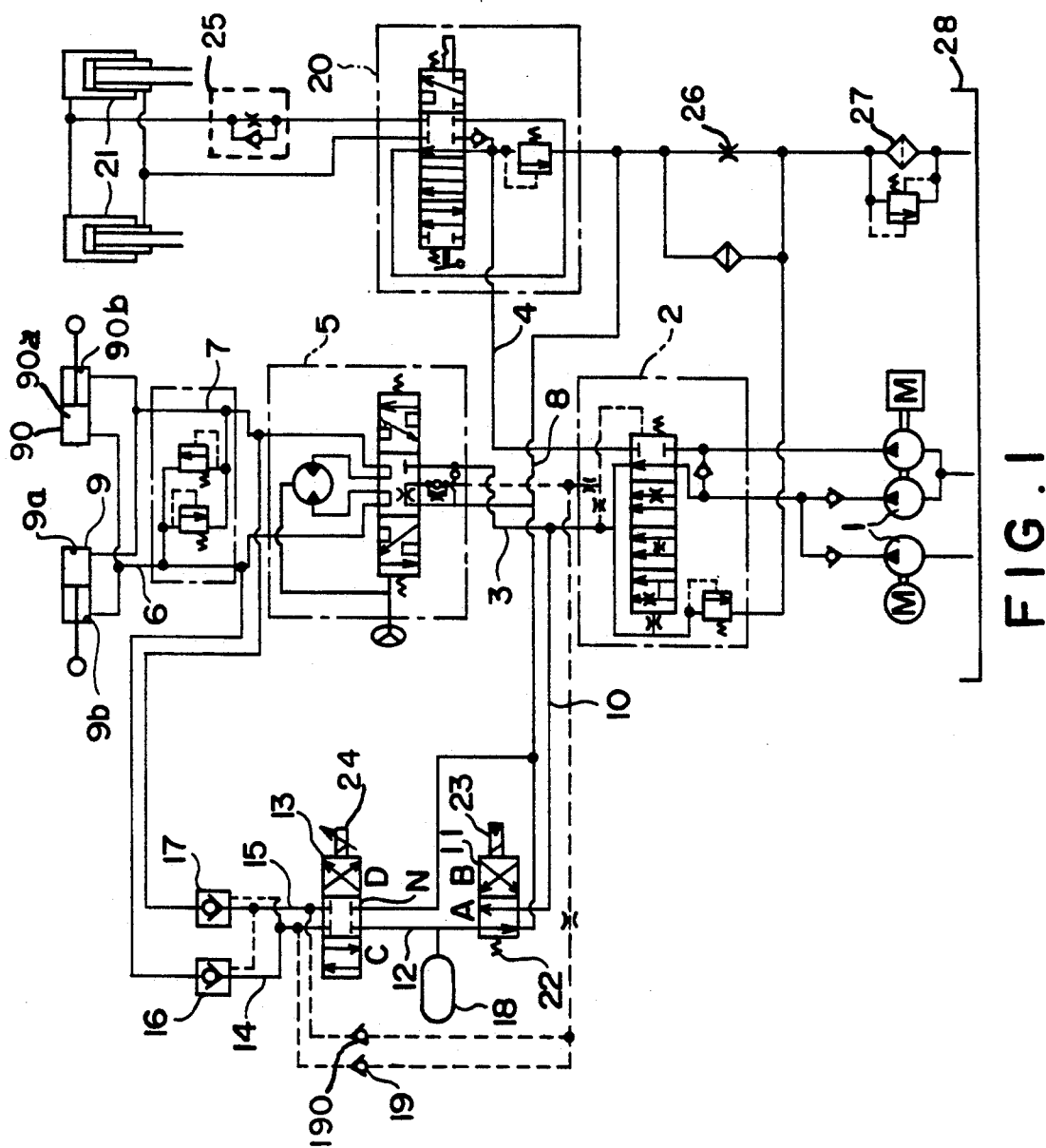
FIG. 1 is a schematic diagram of a hydraulic steering circuit system according to a first embodiment of the present invention.

A first embodiment of the present invention will be described in detail with reference to FIG. 1.

A primary steering circuit for manual operation according to an embodiment of the present invention is constructed as follows.

Pressurized oil discharged from hydraulic pump 1 is fed to a steering line 3 and operation line 4, controlled by demand valve 2. Steering line 3 is connected either to first line 6 or to second line 7 by manual operation steering valve 5. The first and second lines 6, 7 are in turn connected to drain line 8. First line 6 is connected to expanding chamber 90a which increases the volume of right steering cylinder 90 is increased, and contracting chamber 9b which decreases the volume of left steering cylinder 9.

Second line 7 is connected to expanding chamber 9a which increases the volume of left steering cylinder 9, and contracting chamber 90b which decreases the volume of right steering cylinder 90.

An auxiliary steering circuit for automatic operation according to the preferred embodiment of the present invention is constructed as follows.

Steering line 3 is connected to auxiliary steering line 10 which is communicated with and blocked from third line 12 by switching valve 11. Third line 12 is connected either to fourth line 14 or to fifth line 15 by automatic operation steering valve 13, which may be a servo valve. Fourth line 14 and fifth line 15 are connected to first line 6 and second line 7, respectively, by way of first pilot operation check valve 16 and second pilot operation check valve 17, respectively. Accumulator 18 is connected to third line 12. Fourth line 14 and fifth line 15 are connected to demand valve 2 by way of check valves 19, 190 which serve as pilot check valves for demand valve 2.

Operation line 4 is connected to operation cylinder 21 by way of operation valve 20 and slow return valve 25. Throttle 26 and filter 27 are provided between operation cylinder 21 and drain tank 28.

A detailed description of each component of the steering circuit system according to the preferred embodiment the present invention together with a description of its respective operation will be given below.

(1) Operation when switching valve 11 is biased in blocking position A by spring 22.

Pressurized oil discharged from hydraulic pump 1 is fed, by means of manually operating manual operation steering valve 5, to either contracting chamber 9b and expanding chamber 90a by first line 6, or to contracting chamber 90b and expanding chamber 9a by second line 7. Oil in the expanding chambers 9a, 90a or the contracting chambers 9b, 90b flows out to a tank by way of drain line 8. During manual operation, pressurized oil is prevented from flowing into fourth line 14 and fifth line 15 by first pilot operation check valve 16 and second pilot operation check valve 17, whereby manual steering operation can be realized as in the prior art.

(2) Operation when the switching valve 11 is placed in the communicating position B by the magnetization of solenoid 23.

FIG. 1 shows left and right steering cylinders 9 and 90. The following description will be for left cylinder 9 only, for simplicity. Right cylinder 90 operates in a symmetrical fashion to left cylinder 9. That is, when the expanding chamber 9a of left cylinder 9 is filled, contracting chamber 90b of right cylinder 90 is filled and vice versa. When the contracting chamber 9b of left cylinder 9 is filled, the expanding chamber 90a of right cylinder 90 is filled, etc.

Pressurized oil discharged from the hydraulic pump 1 is fed into auxiliary steering line 10, through switching valve 11 and into third line 12. The duty ratio of solenoid 24 is controlled and automatic operation steering valve 13 is shifted from neutral position N to first pressurized oil feeding position C. Pressurized oil discharged from hydraulic pump 1 then flows into fourth circuit 14 and is fed into the contracting chamber 9b of left steering cylinder 9 by first pilot operation check valve 16. Since second pilot operation check valve 17 is opened due to the pressurized oil of fourth line 14, the pressurized oil within expanding chamber 9a of left steering cylinder 9 is discharged to fifth line 15, passes through automatic operation steering valve 13 and on to drain line 8. This effects an automatic steering operation.

When the duty ratio of solenoid 24 is controlled and automatic operation steering valve 13 is placed in second pressurized oil feeding position D, pressurized oil is fed into expanding chamber 9a of left steering cylinder 9, in a manner analogous to that described above. Pressurized oil flows into fifth line 15, and is fed into expanding chamber 9a of left steering cylinder 9 by second pilot check valve 17. Since first pilot check valve 16 is opened due to the pressurized oil of the fifth line 15, the pressurized oil within contracting chamber 9b of left steering cylinder 9 is discharged to fourth line 14, passes through automatic operation steering valve 13 and on to drain line 8.

As in the foregoing description, automatic steering operation can be achieved by switching the switching valve 11 to the communicating position B. In addition, accumulator 18 is connected to the inlet side of automatic operation steering valve 13, that is, to third line 12, thereby absorbing pressurized oil abruptly flowing into third line 12.

Figure 2:
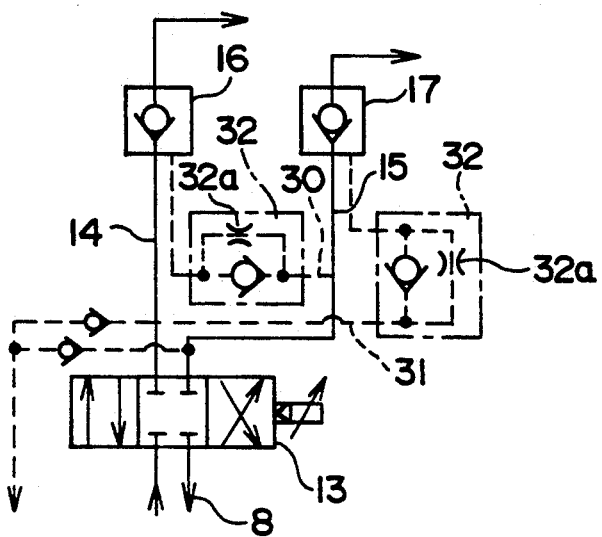
FIG. 2 is a schematic diagram of a hydraulic steering circuit system according to a second embodiment of the present invention.

A second embodiment of the present invention will be described in detail with reference to FIG. 2. The elements of the system which are the same as those as in the first embodiment are omitted from FIG. 2.

Figure 3:
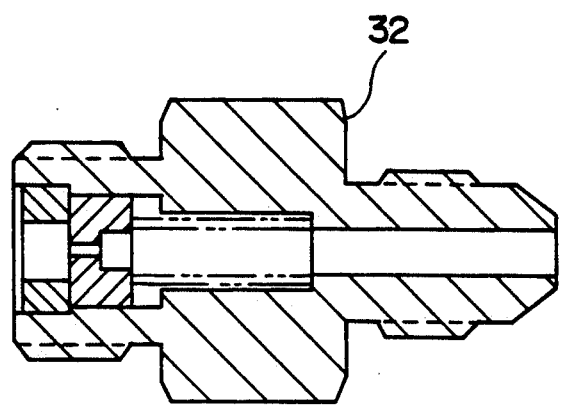
FIG. 3 is a cross section of an orifice check 32 shown in FIG. 2.

An orifice check 32 as shown in FIG. 3 is provided in first pilot line 30 and an identical orifice check 33 is provided in second pilot line 31. Orifice checks 32, 33 feed the pressurized oil of fourth line 14 and fifth line 15 into first pilot operation check valve 16 and second pilot operation check valve 17, respectively. Orifice checks 32, 33 include throttles 32a, 33a.

Thus, pressurized oil of fourth line 14 or fifth line 15 can be smoothly fed into first pilot operation check valve 16 or second pilot operation check valve 17. When pressurized oil is fed to the steering cylinders 9, 90 the pressurized oil draining from steering cylinders 9, 90 is promptly discharged to a tank over drain line 8, thereby improving the steering responsiveness. When pressurized oil ceases to be fed into steering cylinders 9, 90, throttles 32a, 33a within the orifice checks 32, 33 delay the lowering of the pilot pressure so as to allow the pressure of the pressurized oil acting on first pilot operating check valve 16 or second pilot operation check valve 17 to be lowered slowly and to be gradually blocked. As a result, the pressurized oil of drain line 8 drained from steering cylinders 9, 90 is not suddenly blocked, and consequently the steering wheel is not vibrated by the oil hammer and the motion of the vehicle body is stabilized.

While the present invention has been described with respect to preferred embodiments, one of ordinary skill in the art will recognize that further modifications, substitutions and improvements can be made while remaining within the spirit and scope of the present invention. The scope of the present invention is determined solely by the appended claims.

What is claimed is:

1. A steering circuit system for a moving vehicle, comprising:
   a first hydraulic line;
   a second hydraulic line;
   a hydraulic pump having a discharge line;

a first steering cylinder having a first expanding chamber and a first contracting chamber;

a manual operation steering valve connected to the discharge line of the hydraulic pump and having a first position connecting the discharge line with the first contracting chamber by way of the first line, and a second position connecting the discharge line with the first expanding chamber by way of the second line;

a third hydraulic line;

a switching valve connecting discharge line to the third line;

a fourth line having a first pilot operation check valve therein, and a fifth line having a second pilot operation check valve therein, wherein the first pilot operation check valve is constructed to open in response to oil pressure in the fifth line and the second pilot operation check valve is constructed to open in response to pressure in the fourth line;

an automatic operation steering valve having a first position connecting the third line to the first contracting chamber by way of the fourth line, and having a second position connecting the third line to the first expanding chamber by way of the fifth line.

2. A steering circuit system according to claim 1, further comprising a second steering cylinder having a second expanding chamber and a second contracting chamber, wherein said automatic operation steering valve connects said third line to the second contracting chamber by way of said fifth line when said automatic operation steering valve is in said second position, and connects said third line to the second expanding chamber by way of said fourth line when said automatic operation steering valve is in said first position.

3. A steering circuit system according to claim 1, further comprising a first pilot line connecting said fifth line with said first pilot operation check valve, and a second pilot line connecting said fourth line and said second pilot operation check valve.

4. A steering circuit system according to claim 2, wherein when said manual steering valve is in said first position said discharge line is connected to said expanding chamber of said second cylinder by way of said first line, and wherein when said manual steering valve is in said second position said discharge line is connected to the second contracting chamber by way of said second line.

5. A steering circuit system according to claim 3, wherein each of said first and second pilot operation check valves comprises a throttle.

6. A steering circuit system according to claim 1, wherein said automatic operation steering control valve has a third, neutral position in which said third line is not connected to either said fourth or said fifth lines.

7. A steering control circuit according to claim 1, further comprising first and second solenoids for actuating said switching and automatic operation steering valves.

8. A steering control circuit according to claim 1, further comprising a drain line for draining oil from said first, second, fourth and fifth lines.

9. A steering control circuit according to claim 8, further comprising a fourth line drain line having a check valve therein and connected to said drain line for draining oil from the fourth line, and a fifth line drain line having a check valve therein and connected to said drain line for draining oil from said fifth line.

10. A steering control unit according to claim 1, further comprising a demand valve disposed in the discharge line upstream of the switching valve and manual operation steering valve.

11. A steering control unit according to claim 1, further comprising an accumulator disposed in the third line.

12. A steering control unit according to claim 3, further comprising a first orifice check disposed in the first pilot line, and a second orifice check disposed in the second pilot line.

13. A steering control unit according to claim 12, wherein the first orifice check comprises a first throttle, and the second orifice check comprises a second throttle.

* * * * *